(12) United States Patent
Ward et al.

(10) Patent No.: US 7,291,263 B2
(45) Date of Patent: Nov. 6, 2007

(54) POLYMERIC FIBER RODS FOR SEPARATION APPLICATIONS

(75) Inventors: Bennett Clayton Ward, Midlothian, VA (US); Samila Mihindukulasuriya, Richmond, VA (US); David Bradley Harris, Chester, VA (US); Joseph Barrett Payne, Hopewell, VA (US)

(73) Assignee: Filtrona Richmond, Inc., Colonial Heights, VA (US)

( * ) Notice: Subject to any disclaimer, the term of this patent is extended or adjusted under 35 U.S.C. 154(b) by 307 days.

(21) Appl. No.: 10/921,720

(22) Filed: Aug. 19, 2004

(65) Prior Publication Data

US 2005/0072737 A1 Apr. 7, 2005

Related U.S. Application Data

(60) Provisional application No. 60/550,398, filed on Mar. 5, 2004, provisional application No. 60/496,620, filed on Aug. 21, 2003.

(51) Int. Cl.
*B01D 15/08* (2006.01)

(52) U.S. Cl. .............. 210/198.2; 210/502.1; 210/635; 210/656

(58) Field of Classification Search .......... 210/502.1, 210/635, 656, 659, 198.2
See application file for complete search history.

(56) References Cited

U.S. PATENT DOCUMENTS

| | | | |
|---|---|---|---|
| 2,936,482 A | 5/1960 | Kilian | |
| 3,176,345 A | 4/1965 | Powell | |
| 3,192,562 A | 7/1965 | Powell | |
| 3,457,341 A | 7/1969 | Duncan et al. | |
| 3,808,125 A * | 4/1974 | Good | 73/23.39 |
| 3,878,092 A * | 4/1975 | Fuller | 210/198.2 |
| 4,117,194 A | 9/1978 | Barbe et al. | |
| 4,162,977 A | 7/1979 | Buillemin et al. | |
| 4,173,504 A | 11/1979 | Tomioka et al. | |
| 4,208,284 A * | 6/1980 | Pretorius et al. | 210/767 |
| 4,217,321 A | 8/1980 | Campbell | |
| 4,270,962 A | 6/1981 | Sugihara et al. | |
| 4,286,005 A | 8/1981 | Berger | |
| 4,354,889 A | 10/1982 | Berger | |
| 4,512,897 A * | 4/1985 | Crowder et al. | 210/656 |

(Continued)

FOREIGN PATENT DOCUMENTS

DE 19923344 11/2000

(Continued)

OTHER PUBLICATIONS

"New Concepts in Melt-Blown Design Applied to", Eckhard, Schwarz Biax-Fiberfilm Corp., Mar. 1987, pp. 206-220.

(Continued)

*Primary Examiner*—Ernest G. Therkorn
(74) *Attorney, Agent, or Firm*—Hunton & Williams LLP

(57) ABSTRACT

A separation element is provided for use in a chromatographic analysis system for the separation of a mixture using a stationary phase and a mobile phase. The separation element comprises a fluid transmissive fiber rod comprising a plurality of fibers entangled to provide a tortuous path through which a mobile phase may flow as part of a separation process. The plurality of fibers provides a stationary phase for the separation process.

26 Claims, 13 Drawing Sheets

U.S. PATENT DOCUMENTS

| | | | |
|---|---|---|---|
| 4,729,808 A | 3/1988 | Berger | |
| 4,789,479 A * | 12/1988 | Onitsuka et al. | 210/635 |
| 4,872,979 A * | 10/1989 | Golay | 210/198.2 |
| 5,059,654 A * | 10/1991 | Hou et al. | 525/54.1 |
| 5,100,547 A | 3/1992 | Hardiman et al. | |
| 5,135,627 A * | 8/1992 | Soane | 204/455 |
| 5,160,627 A * | 11/1992 | Cussler et al. | 210/639 |
| 5,162,074 A | 11/1992 | Hills | |
| 5,207,915 A * | 5/1993 | Hagen et al. | 210/635 |
| 5,445,884 A | 8/1995 | Hoyt et al. | |
| 5,509,430 A | 4/1996 | Berger | |
| 5,595,649 A * | 1/1997 | Markell et al. | 210/198.2 |
| 5,607,766 A | 3/1997 | Berger | |
| 5,620,641 A | 4/1997 | Berger | |
| 5,633,082 A | 5/1997 | Berger | |
| 5,656,448 A | 8/1997 | Jemo et al. | |
| 5,667,976 A | 9/1997 | Tabone et al. | |
| 5,693,223 A * | 12/1997 | Yamada et al. | 210/198.2 |
| 5,693,228 A * | 12/1997 | Koehler et al. | 210/656 |
| 5,800,706 A * | 9/1998 | Fischer | 210/198.2 |
| 5,811,186 A * | 9/1998 | Martin et al. | 428/373 |
| 6,103,181 A | 8/2000 | Berger | |
| 6,330,883 B1 | 12/2001 | Berger | |
| 6,656,360 B2 * | 12/2003 | Rohrbach et al. | 210/638 |
| 2003/0116499 A1 | 6/2003 | Ward et al. | |
| 2003/0194260 A1 | 10/2003 | Ward et al. | |
| 2003/0222372 A1 | 12/2003 | Ward et al. | |
| 2004/0041285 A1 | 3/2004 | Xiang et al. | |
| 2005/0000874 A1 * | 1/2005 | Jinno et al. | 210/198.2 |

FOREIGN PATENT DOCUMENTS

| | | |
|---|---|---|
| GB | 2036115 | 11/1979 |
| WO | WO 96/39054 | 12/1996 |
| WO | WO 03/022393 A1 | 3/2003 |
| WO | WO 03/031978 A1 | 4/2003 |
| WO | WO 03/058245 A1 | 7/2003 |

OTHER PUBLICATIONS

"Bicomponent Fibers: A Personal Perspective", Ifj, Jun. 1998, pp. 26-42.

*Textured Yarn Technology*, vol. 1, "Production, Properties and Processing," Monsanto Co., 1967, pp. 13-14, 17.

"Fundamentals of Fibre Formation, The Science of Fibre Spinning and Drawing", Ziabicki, pp. 366-373, 386 Undated.

"Conventional Packed Columns vs. Packed or Open Tubular Microcolumns in Liquid Chromatography", Gulochon, American Chemical Society, 1981, pp. 1318-1325.

"The Dependence of Performance on Fiber Uniformity in Aligned Fiber HPCL Columns", Hegedus, Journal of Chromatographic Science, vol. 26, Sep. 1988, pp. 425-431.

"Overloaded Hollow-Fiber Liquid Chromatography", Ding, et al., Biotechnol. Prog., 1990, vol. 6, No. 6, pp. 472-478.

"Optimal Packing Characteristics of Rolled, Continuous Stationary-Phase Columns", Li, et al., Biotechnol. Prog., Feb. 13, 2002, vol. 18, No. 2, pp. 309-316.

* cited by examiner

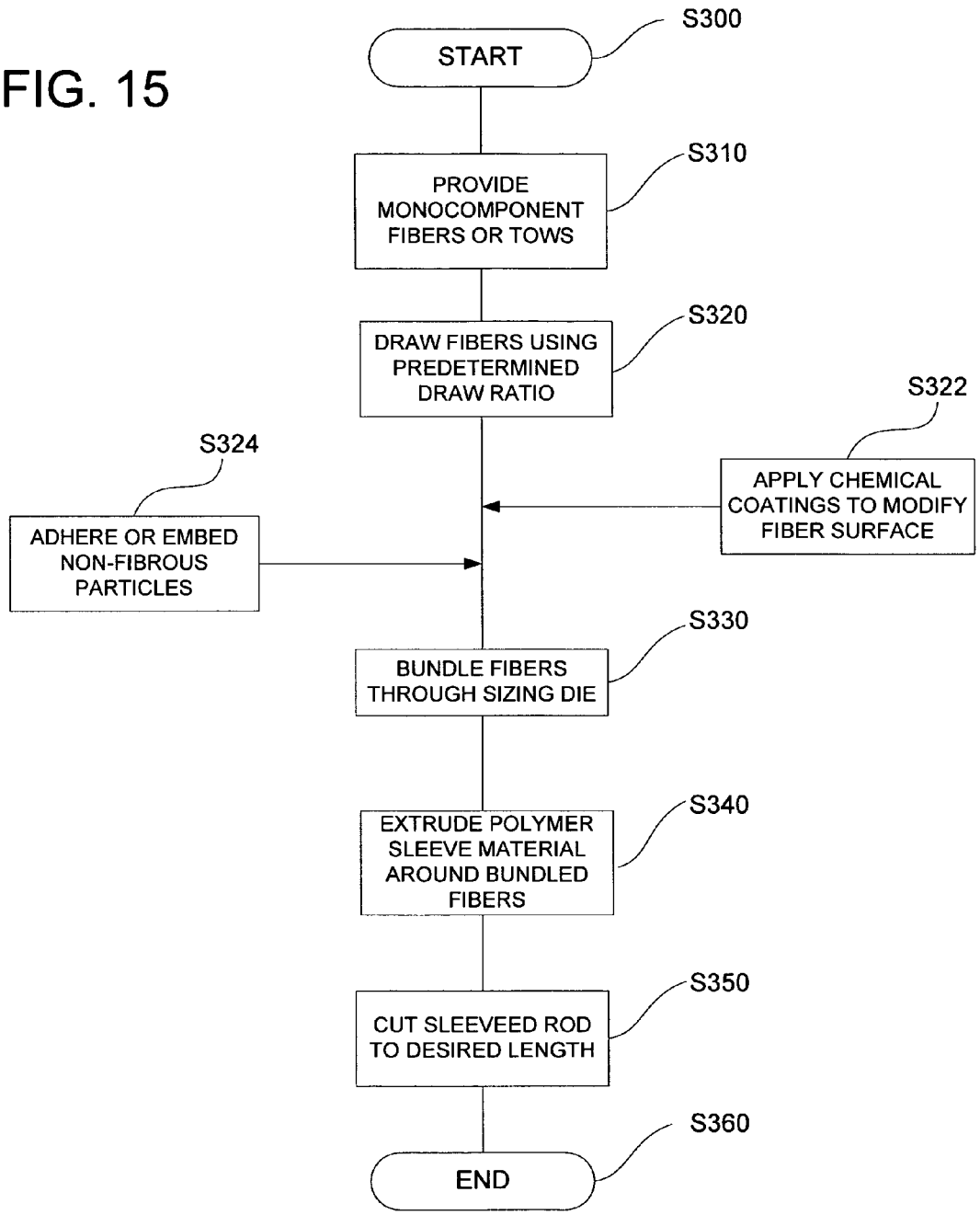

POLYMERIC FIBER RODS FOR SEPARATION APPLICATIONS

RELATED APPLICATIONS

This utility application claims priority to U.S. Provisional Application No. 60/496,620 filed Aug. 21, 2003 and 60/550,398 filed Mar. 5, 2004, both of which are hereby incorporated by reference in their entirety.

FIELD OF THE INVENTION

This invention generally relates to separation processes and more particularly to fiber column stationary phase materials for high-performance liquid chromatography (HPLC) and solid phase extraction techniques.

BACKGROUND OF THE INVENTION

The separation of various components from mixtures is commonly performed in the sciences. Chromatography is one of the most common processes used to perform such separation and chromatography methods are well known.

Chromatography processes involve the separation of mixture components by the distribution of the components in a stationary phase and a mobile phase. The stationary phase is typically an immobile packing material in a defined space, such as the interior of a tube. The mobile phase is typically a liquid phase that passes through, over, and/or around the stationary phase. The mobile phase includes a solvent and the components of the mixture to be resolved, which are dissolved in the solvent. The resolution of the components of the mixture from the mobile phase occurs by contacting the stationary phase with the mobile phase, such as is used in HPLC processes.

Positioning of the packing in the steel tube provides channels through which the mobile phase may travel. During its travel through the stationary phase, the mobile phase may react with or interact with the packing materials, thereby separating or resolving the components of the mobile phase.

Stationary phases used with HPLC processes and other solid phase extraction systems include silica-based components, although polymer-based stationary phases have also been developed in both bead and monolith form. Typically, the stationary phase in an HPLC column or other solid phase extraction device includes silica-based or polymer-based beads packed in a column. The columns are typically reusable glass or steel tubes lined with polyethyletherketone (PEEK) that can withstand the back pressures experienced during the separation process. The packing materials may be coated with species that assist in the separation of mixtures, such as C-4, C-8 and C-18. Beads are placed inside these columns by physically packing them into the containing structure. Beads used in polymeric separations typically vary in diameter from 5-50 μm, and are packed in a very dense manner. This dense packing creates very little void volume, creating high column back pressures, often greater than 5000 psi (344.7 bar).

Columns containing a monolithic polymer are formed via in-situ polymerization. Monolithic polymer stationary phases exhibit lower back pressures than polymeric bead stationary phases.

WO 03/022393 teaches using polymer fibers as a stationary phase for chemical separations including liquid chromatography. However, the fibers of this reference are loose capillary-channeled fibers that are drawn through a conventional column, the plurality of fibers colinearly extending the full length of the column.

Improvements to current separation processes such as HPLC and solid phase extraction systems may be desirable.

SUMMARY OF THE INVENTION

Accordingly, it may be desirable to replace the column packing materials heretofore used in separation processes with a separation element that comprises a fiber rod that produces lower back pressures, reduces costs and provides repeatable performance for the separation of certain mixtures. It may also be desirable to provide separation processes that use fiber rods as a stationary phase.

According to various embodiments of the invention, separation systems and fiber rods for use in such systems are disclosed. In an illustrative embodiment, a separation element is provided for use in a chromatographic analysis system for the separation of a mixture using a stationary phase and a mobile phase. The separation element comprises a fluid transmissive fiber rod comprising a plurality of fibers entangled to provide a tortuous path through which a mobile phase may flow as part of a separation process. The plurality of fibers provides a stationary phase for the separation process.

BRIEF DESCRIPTION OF THE DRAWINGS

FIG. 15 is a flow diagram of a process for manufacturing an unbonded fiber rod according to an embodiment of the invention.

DETAILED DESCRIPTION OF THE INVENTION

Figure 1:
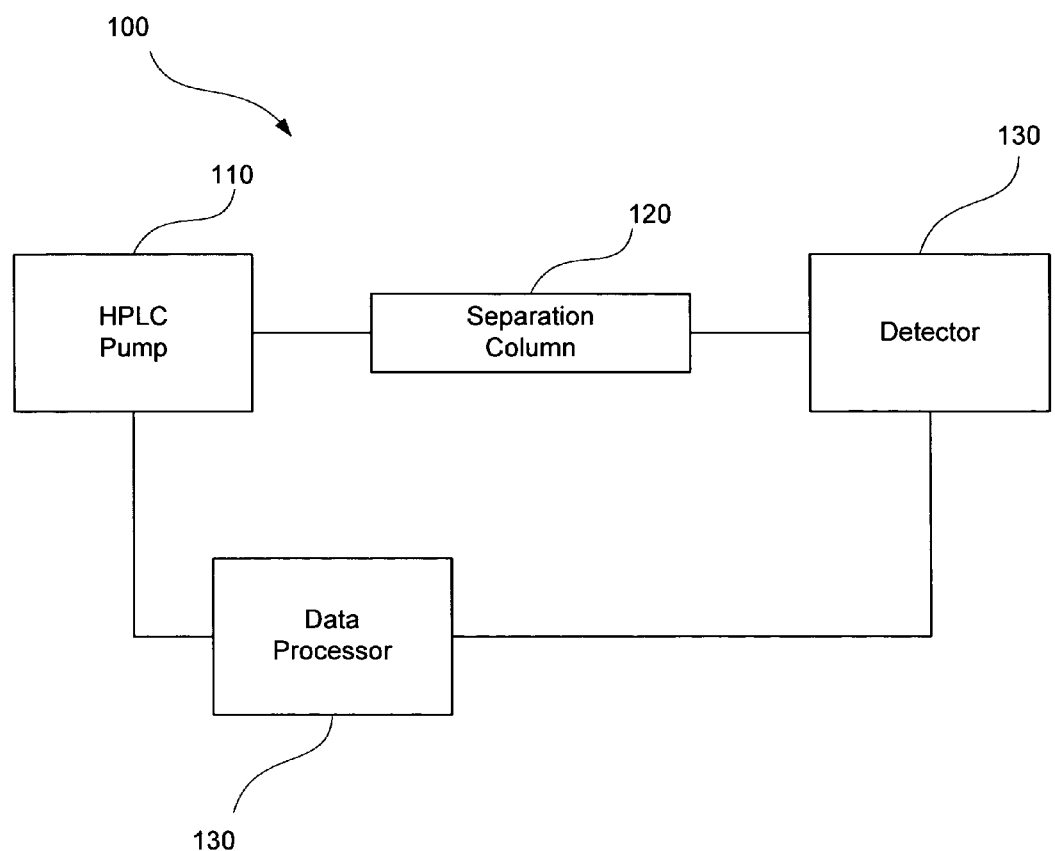
FIG. 1 is an illustration of a separation system according to an embodiment of the invention.

The invention generally relates to separation processes and more particularly to fiber column stationary phase materials for use in chromatographic analysis systems such as high-performance liquid chromatography (HPLC) and solid phase extraction systems. According to embodiments of the invention, fibers may be used in chromatographic analysis systems as the stationary phase in combination with a mobile phase to separate components of a mixture dissolved in the mobile phase, such as the separation of biomolecules. The fibers may be entangled to create a tortuous path for a mobile phase of a separation process wherein the fibers are used as a stationary phase. In some embodiments, the fibers are bonded to one another to form a self-sustaining, rod-like structure. As used herein, the term "self-sustaining" as used in reference to a fiber rod means that the fiber rod has sufficient strength and integrity to maintain its initial shape and structure without the addition of a sleeve or tube. In other embodiments, aligned or entangled unbonded fibers are held in a rod-like configuration by a polymer sleeve. The unbonded fibers alone do not form a self-sustaining rod, but the sleeve/fiber combination results in a self-supporting rod having the required strength and integrity. In many instances, the structural strength and integrity of the rod (with or without a sleeve) need not be any greater than what is required for handling and loading the fiber rod into a more robust tube.

Liquid chromatography enables the separation of mixtures via differential interaction of components, or analytes, of the mixture with the stationary and mobile phases. Analytes that show greater affinity for the stationary phase will elute at a later time, while those analytes that have a greater affinity for the mobile phase will elute sooner. For mixtures in which the selectivity of the analytes differs immensely, i.e. one component has a very high affinity for the stationary phase while another has a very high affinity for the mobile phase, a gradient can be employed to decrease the elution time of the analytes. The gradient is a gradual change in solvent composition so that a component with a low affinity for the mobile phase of the initial solvent composition may have a greater affinity for the mobile phase as the composition is changed, speeding its elution.

Embodiments of the invention include separation elements comprising fiber rods for use as the stationary phase in chromatographic and/or solid phase extraction techniques. The fiber rods are capable of transmitting fluid and may comprise fibers that can be manufactured as a cartridge that can then be inserted in a column of a separation system, such as an HPLC column. In some embodiments, the fibers are highly entangled to provide a tortuous path for a mobile phase when the fiber rod is used as the stationary phase. The tortuous path promotes uniform fluid flow throughout the column and the equal wetting of all of the fiber surfaces in the column, while exhibiting low back pressures. Low back pressures may be pressures less than about 1500 psi (103.4 bar), typically less than about 1000 psi (68.9 bar). This may result in enhancing the working surface-to-volume ratio of interaction between analytes, mobile phase, and fiber surfaces in the column.

The fiber rods of the invention may be formed from any fiber type, including extruded fibers, monocomponent fibers, bicomponent fibers, melt-blown fibers, wet-spun fibers, dry-spun fibers, bonded fibers, and the like. The fibers may be bonded such that the fibers produce self-sustaining fiber rods or the fibers may be unbonded, formed into rods by bundling the fibers and wrapping them in a thermoplastic sleeve.

It has been found that the use of fiber rods in separation columns results in high pore uniformity throughout the stationary phase. High pore uniformity permits separation systems to be operated at lower working pressures, resulting in higher throughputs and reduced analytical time. Additionally, where the fibers of the fiber rod are bonded to produce a self-sustaining fiber rod, even lower working pressures may be achieved, further enhancing the operation of the separation system.

Unlike conventional packing materials, fiber rods for use in separation columns may be manufactured in a high speed, automated environment. This may have the effect of reducing variation between columns as seen in individually packed beaded columns, while at the same time significantly reducing the amount of time needed to change out the column material. Automated manufacturing may additionally minimize the number of unusable columns often found in conventional packing materials that require re-packing of the column prior to use in the separation process.

The fiber rods of the invention have the additional advantage that they may be used with existing chromatography equipment. In some embodiments, the fiber rods of the invention may be used as cartridges for insertion into existing separation tubes. In other embodiments, pressure-sustaining sleeved fiber rods may be used to replace the separation tubes used in existing equipment.

Certain embodiments of the invention provide for fibers as a stationary phase for performing chromatographic separation of organic compounds, such as biomolecules, in HPLC systems. A sample comprising dissolved analytes for separation may be fed to a chromatographic column as the mobile phase of the separation process and a column comprising a fiber rod may be used to provide the stationary phase of the separation process. Varying levels of interaction of the analytes with the stationary phase separates the analytes as the mobile phase moves through the column.

Still other embodiments of the invention include the use of fiber rods in low-pressure chromatography and solid phase extraction methods according to methods as known in the art. Those of ordinary skill in the art will readily appreciate that the separation columns described herein can analogously be used with these and other separation techniques.

Processes that separate materials using mobile and stationary phases typically comprise a column that includes the stationary phase, a pump to push the mobile phase through the column, and a detector that measures various characteristics of the mobile phase as it exits the column. A computer is typically employed as part of a data processor to assist in recording and/or monitoring the characteristics of the eluent exiting the column.

It should be appreciated that in some separation processes, the mobile phase may be fed through a column by gravity rather than through the use of a pump. In such processes, a sample is placed at the top of a vertically supported column and is eluted as the mobile phase passes through the column. The separation of the sample can be determined using a detector and a data processor or by assaying eluted fractions of the sample.

An exemplary separation system 100 comprising a separation column is shown in FIG. 1, which illustrates an HPLC system. A separation column 120 is attached to a binary HPLC pump 110 having an attached degasser (not shown). In prior art systems, the separation column 120 includes a separation column tube (not shown) having a stationary phase separation material contained therein. In systems of the present invention, the separation column 120 comprises a fiber rod separation element that serves as the stationary phase in the HPLC process. As will be discussed, the separation column may also comprise a pressure-sustaining tube into which the fiber rod separation element is loaded. In both the prior art system and systems according to the invention, a solvent, or eluent, is used to dissolve the mixture of interest and the solution containing the dissolved analytes is pumped through the separation column 120 as the mobile phase. The eluent is pumped through the separation column 120 and exits through a detector 130 at the opposite end of the separation column 120 from where it entered.

Based upon the affinity of the different compounds for the stationary phase, different analytes are eluted at different times. The detector 130 is used to determine what analytes are being eluted. The detector 130 may be an ultraviolet (UV) absorbance detector or a Refractive Index (RI) detector, although any type of detector capable of determining identifying characteristics of the eluent exiting the column may be used. Depending on the level of UV absorbance, for example, that is detected in the eluting liquid, the quantitation of the components in the sample mixture may be determined. A data processor 140 may be used to execute software that operates the detector 130 and/or to record the absorbance data, which is typically recorded as a function of time. The data processor 140 may also execute software that controls the amount and composition of eluent introduced into the separation column 120 by the pump 110, particularly when an eluent gradient is employed.

As noted above, the separation column 120 may include a fiber rod separation element that serves as a stationary phase when the separation system is in use to separate components of mixture dissolved in a mobile phase. The fiber rod separation element may be inserted into a separation tube, which provides an impermeable, pressure resistant wall through which the mobile phase is passed. The tube may be a glass or steel tube similar or identical to those used in conventional separation systems. Alternatively, the separation tube may be replaced by a polymeric sleeve that surrounds and confines the fibers of the rod.

Dimensions of the fiber rod used to separate the components of a mixture may vary depending on the amount and type of analytes to be separated, the solvent used, and the composition of the fibers used in the fiber rod, by way of example only. Generally, the fiber rod may be from about 5 cm up to about 40 m and longer in length. Typically, the fiber rod is about 25 to about 30 cm in length. The fiber rod will typically (though not necessarily) be sized and configured to fill the interior of the entire length of the separation tube. A separation column that has no void space except for the void space within the fiber rod itself is often desirable and in some instances, essential. Thus, the inner diameter of the tube generally corresponds to the outer diameter of the fiber rod and may range from about 1 µm to about 1000 mm. A typical inner diameter will be in a range from about 1 mm to about 300 mm, still more typically about 1 mm to about 20 mm. Higher cross-sectional areas may be particularly advantageous when used in combination with low operating pressures, which may further lend the column for use in preparatory applications, including commercial production or preparation or proteins, for example.

The porosity of the fiber rods of the invention typically ranges from about 10% to about 90%, more typically about 30% to about 50%, and preferably about 40%, although the range may vary depending on the solvents used and the desired components to be separated.

It will be appreciated by those of ordinary skill in the art that low pressure chromatography, column chromatography and solid phase extraction processes may be conducted in a similar manner using separation columns comprising fiber rods as described.

The fibers of the fiber rods form a tortuous path through the column, which promotes uniform fluid flow of the mobile phase throughout the column and promotes equal wetting of all of the fiber surfaces in the column. The fibers may be of any size and may be filaments or staple fibers. The fibers typically have a cross-section with a maximum length dimension about 1 µm to about 150 µm. Fiber rods according to the invention may be formed with the fibers in general alignment. However, it has been found that forming the rods from non-aligned, entangled fibers tends to increase the tortuosity of the path of the mobile phase. Entangling the fibers also tends to enhance the self-sustainability of a bonded fiber structure. Once entangled, the fibers may be subjected to a heat treatment to create the self-sustaining bonded fiber mass. The fiber mass may then be formed into any shape through the use of a die, such as in the form of a fiber rod usable in a tubular separation column.

The fibers may advantageously be formed into cylindrical rods or rods of other shapes useful to provide a cartridge that can be directly inserted into an impermeable, pressure-resistant tube for use with a separation system, such as a glass or PEEK-lined steel tube for example. The fibers may be contained within an impermeable, pressure-resistant sleeve of polymeric material that surrounds the fibers to form a fiber rod for insertion into the tube.

Alternatively, where the fibers are surrounded by a polymeric sleeve, the sleeved fiber rod may be used as a complete, integrated separation column. When provided with a sufficiently pressure resistant sleeve, this integrated separation column may be used in the separation system without the need for an additional separation tube. In such embodiments, the pressure resistant sleeve performs the pressure vessel function of the glass or steel tubes, eliminating the need for a separate container as part of the column.

The fiber rods of the invention may be used as a cartridge, which may be inserted into a pressure resistant, impermeable tube, typically a glass or steel tube lined with PEEK that has two open ends. The cross-section of the cartridge preferably matches the cross-section of the tube, typically a circle, although other shapes are possible. The cartridge has an outer diameter that approaches that of the inner diameter of the tube, such that the cartridge is sized for a close tolerance or interference fit with the inner surface of the tube to prevent flow of the mobile phase from circumventing the fiber rod and flowing around or outside of the cartridge.

The cartridge is typically as long as or longer than the tube to ensure that tube is fully packed with the fibers. Any excess length of the cartridge that extends beyond either or both ends of the tube may be cut off or otherwise removed. This results in a column in which the opposite ends of the cartridge are flush with the tube. Typically, porous frits and or fittings are attached on each end of the column, which is then inserted into a separation system. As will be appreciated by those of skill in the art, the size and type of fittings may vary depending on size and shape of the outlets and inlets of other parts of the separation system. The frits and/or fittings are preferably attached to the tube in such a manner as to prevent compression of the fiber rod within the tube.

Figure 12:
FIG. 12 is an electron micrograph of a bonded fiber rod.

The fibers may comprise various types of fiber material. In one embodiment, the fiber rod is a self-sustaining, bonded fiber rod in which the fibers are bonded to each other at spaced apart contact points. Bonded fiber may provide particularly tortuous pathways for travel of the mobile phase when the bonded fiber is used as the stationary phase in a separation system. FIG. 12 shows an electron micrograph of fibers 1210 bonded at bonding points 1220. FIG. 12 demonstrates the tortuous path the mobile phase must take around and through the bonded fibers 1210.

The fibers of the bonded-fiber cartridge may be monocomponent, bicomponent, or a combination of the two. Bicomponent fibers may be spun or melt-blown bicomponent fibers. The bicomponent fibers may be core-sheath, bimodal, or a combination of the two as described in U.S. Pat. No. 6,103,181 which is incorporated herein by reference. The fibers may be crimped, either through self-crimping or mechanical crimping. Bonded bicomponent staple fibers may also be used.

The composition of the fibers may be any thermoplastic or resin material, including by way of example only, polyamides, such as nylons, including nylon 6 and nylon 6,6; polyolefins, such as polyethylene and polypropylene; polyesters including polyethylene terephthalate and polybutylene terephthalate; polyvinyl chloride; polymers of ethylene methacrylic acid, ethylene acrylate acid, ethylene vinyl acetate, or ethylene methyl acrylate; polystyrene; polysulfones; polyphenylene sulfide; polyacetals; and polymers comprising blocks of polyethylene glycol; as well as copolymers and derivatives of all of the foregoing. Where bicomponent fibers are used, the components may be the same or different compositions. Typical bicomponent fibers include core/sheath bicomponent fibers of polyester/copolyester, polyester/nylon, polypropylene (PP)/low density polyethylene (LDPE), and ethylene acrylic acid/PP.

The fibers may be bonded by heating the entangled fibers to near their melting point. The fibers are then cooled to fuse the fibers together at various points where the fibers contact one another. Exemplary processes for producing bonded fiber products are described in U.S. Pat. No. 5,607,766, which is incorporated herein by reference. According to one such process, two different polymers are eccentrically co-extruded to produce bicomponent fibers. The fibers may be drawn to a predetermined draw ratio. The drawn fibers may then be heated and passed through a forming die to form a self-sustaining, bonded fiber rod.

Figure 2:
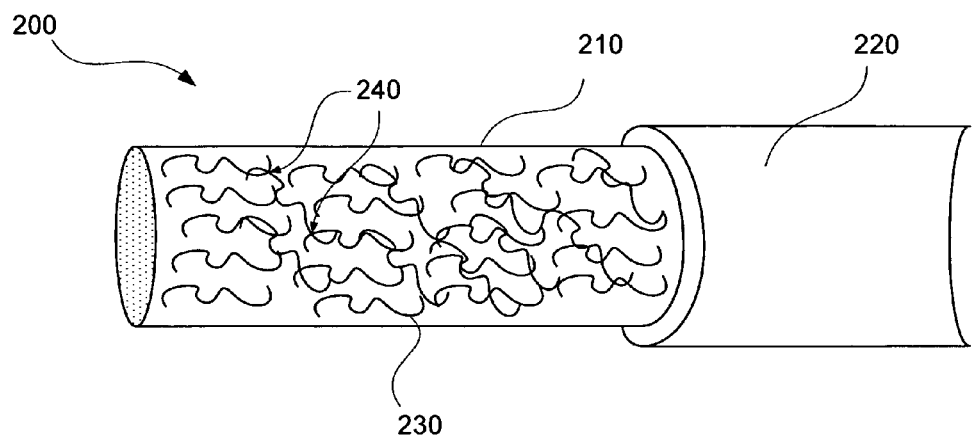
FIG. 2 illustrates a separation column according to exemplary embodiments of the invention comprising a self-sustaining fiber rod cartridge.

With reference to FIG. 2, a separation column 200 may comprise a self-sustaining bonded-fiber rod 210 that may be inserted into a separation column tube 220 that is similar to the tubes used in prior art packed chromatography columns. The separation column tube 220 is configured to form an impermeable, pressure-sustaining wall for the separation column 200. As in prior art columns, the separation column tube 220 may be reusable. The fiber rod 210 may be a self-sustaining bonded fiber rod comprising a plurality of fibers 230 that are entangled and bonded to one another at a plurality of bonding points 240 throughout the rod 210. It will be understood that the fiber rod 210 is essentially a cartridge that may be directly inserted into the tube 220 prior to testing, then removed after testing so that the separation column tube 220 may be either cleaned and reused, as is typically the case with a glass tube, or disposed of, as is typically the case with a PEEK-lined steel column.

Figure 3:
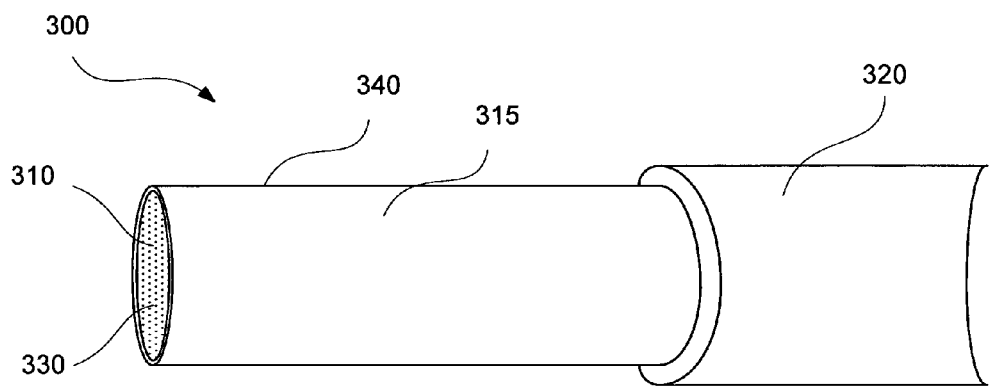
FIG. 3 illustrates a separation column according to exemplary embodiments of the invention including a cartridge comprising a fiber rod and an impermeable, pressure-resistant sleeve.

According to another embodiment of the invention illustrated in FIG. 3, a sleeved fiber rod 340 comprises a self-sustaining bonded fiber rod 310 and a thermoplastic sleeve 315 surrounding the bonded fibers 330. material The polymer for the sleeve may be any thermoplastic material and may be the same or different from the polymer(s) of the bonded fiber rod. Exemplary materials for use in manufacturing the sleeve include polypropylene, polyethylene (typically high density polyethylene (HDPE)), polyester and nylon, although other materials may be used. The fibers and sleeve may be integrally manufactured, and the fibers may be adhered or bonded to the surface of the sleeve material. The sleeve is preferably impermeable, which may provide such advantages as eliminating the need to clean the tube into which the cartridge is placed.

As shown in FIG. 3, the sleeved fiber rod 340 may be used as a cartridge for insertion into a separation column tube 320. As will be discussed in more detail below, the sleeve 315 of the sleeved fiber rod 340 may be configured to sustain the back pressure of the separation system so that the separation column tube 320 may be eliminated from the system.

Figure 13:
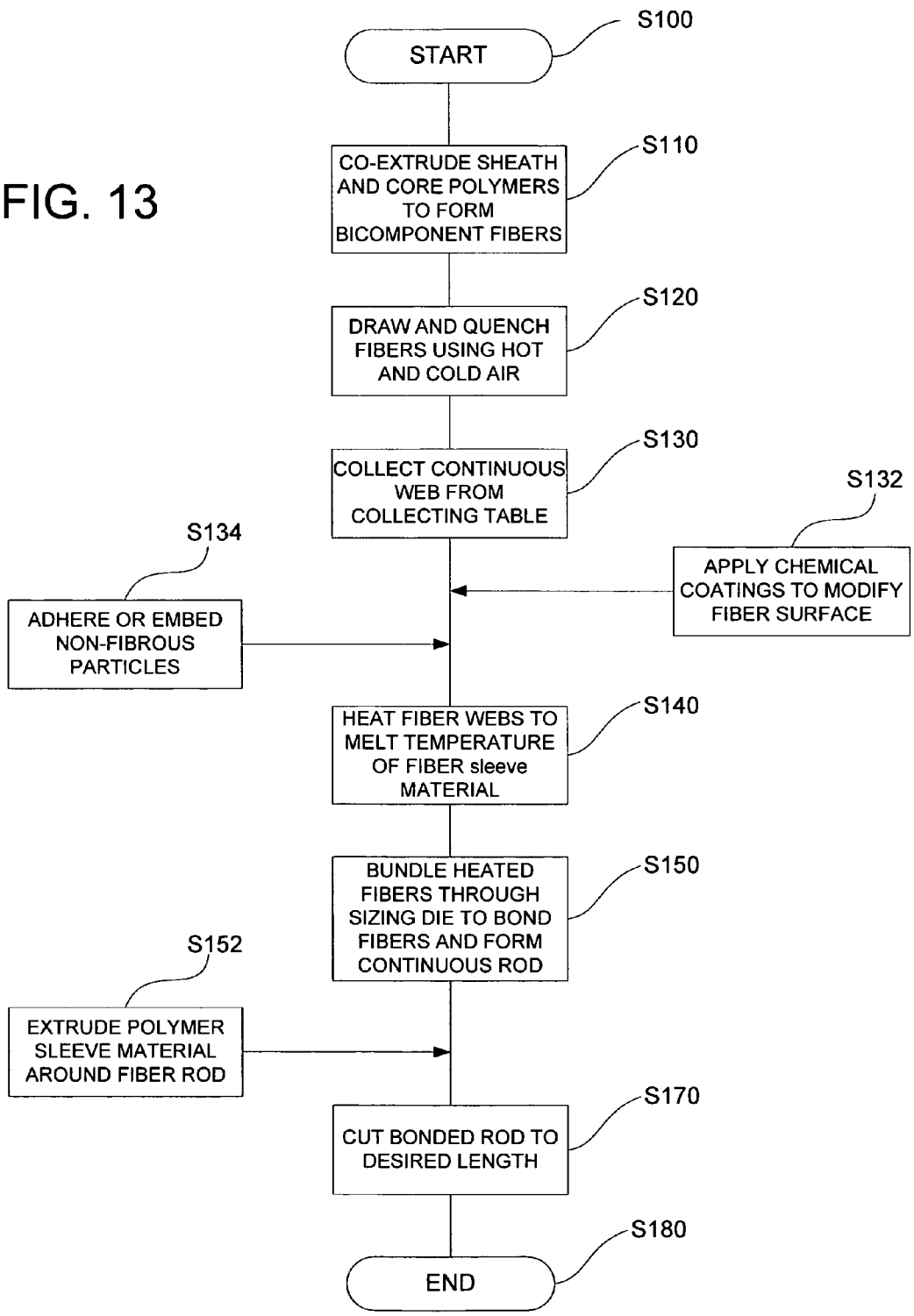
FIG. 13 is a flow diagram of a process for manufacturing a bonded fiber rod according to an embodiment of the invention.

As discussed above, the bonded fiber rods of the invention may be formed from a variety of materials using various processes. FIG. 13 is a flow diagram of an exemplary manufacturing process for producing a bonded fiber rod using melt blown bicomponent fibers. The process begins at S100 and at S110, the bicomponent fiber materials are co-extruded to form sheath-core bicomponent fibers using methods known in the art. At S120, the fibers are drawn and quenched using known melt-blown/spinning techniques. At S130, the spun fibers are collected in a continuous web. The fiber web may then be drawn at a predetermined draw ratio. At S140, the fibers are heated to the melt temperature of the fiber sheath material. The fiber web is then passed through a heated forming die to form a cylindrical rod at S150. Upon cooling the entangled fibers remain bonded to one another at spaced apart contact points. This provides a self-sustaining fiber rod that may be cut to desired lengths at S170. The process ends at S180.

In addition to the steps described above, the process shown in FIG. 13 may include one or more optional steps. As discussed above, fiber rods according to the invention may be supplied with a thermoplastic polymer sleeve surrounding the fibers. Thus the process of FIG. 13 may include at S152 the extrusion of a sleeve material, such as an extruded polymer or polymer wrap, around the continuous fiber rod prior to cutting. The sleeve material may hold the plurality of fiber elements in a desired shape. The fibers and sleeve may be integrally manufactured, and the fibers may be adhered or bonded to the surface of the sleeve material. As will be discussed in more detail below, additional materials may be added to the fibers to enhance the separation performance of the stationary phase. This may be accomplished by applying chemical coatings to modify the fiber surface as shown at S132 and/or by adding non-fibrous particles to the fiber structure as shown at S134. As is discussed in more detail below, these particles may be adhered to the fibers or may simply be embedded in the entangled fiber structure.

Figure 14:
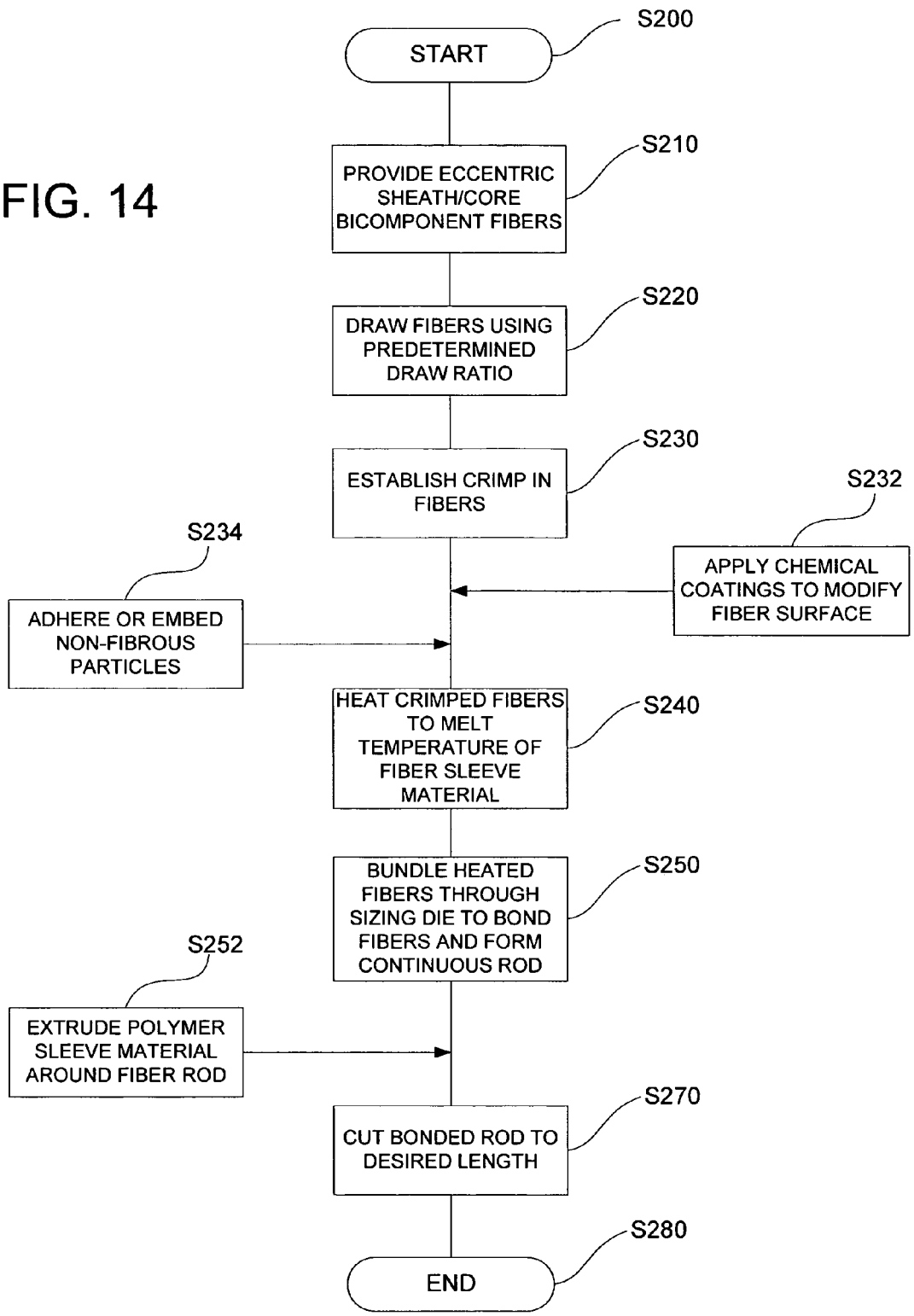
FIG. 14 is a flow diagram of a process for manufacturing a bonded fiber rod according to an embodiment of the invention.

FIG. 14 is a flow diagram of an exemplary manufacturing process for producing a bonded fiber rod using self-crimping fibers. The process begins at S200 and at S210, eccentrically formed sheath-core bicomponent fibers are provided. At S220, the fibers are drawn at a predetermined draw ratio. At S230, the fibers are passed through an air jet which causes the fibers to adopt a crimp as is known in the art. The fibers are then heated at S240 to melt or soften the fiber sheath material, bundled and drawn through a forming die to form a continuous cylindrical rod at S250. Upon cooling the entangled fibers remain bonded to one another at spaced apart contact points. This provides a self-sustaining fiber rod that may be cut to desired lengths at S270. The process ends at S280.

As in the previously described process, the process shown in FIG. 14 may include any or all of the additional steps of extruding a sleeve material around the continuous fiber rod at S252, such as an extruded polymer or polymer wrap where the sleeve material holds the plurality of fiber elements in a desired shape, as described above. The fibers and sleeve may be integrally manufactured. The fibers may be adhered or bonded to the surface of the sleeve material, and chemical coatings may be applied to modify the fiber surface at S232 and non-fibrous particles may be added to the fiber structure at S234.

According to yet another embodiment of the invention, unbonded fibers that would otherwise not be self-sustaining, may be formed into a self-supporting rod by coating a bundle of fibers with a sleeve material such as an extruded polymer or polymer wrap where the sleeve material holds the plurality of fiber elements in a desired shape, as described above. The fibers and sleeve may be integrally manufactured, and the fibers may be adhered or bonded to the surface of the sleeve material. The resulting sleeved rod would be similar to the sleeved rod 340 shown in FIG. 3, with the exception that the fiber rod 310 would comprise unbonded fibers instead of bonded fibers. The unbonded fibers may be entangled or they be in general alignment with one another. While the unbonded fibers may typically be less entangled or intermingled than in fiber rods of bonded fibers, the rods may be adapted to have the same or a similar amount of porosity as bonded fiber rods.

Unbonded fiber rods may be produced by simultaneously drawing a plurality of fibers under tension into a bundle and feeding them to an extruder where a molten thermoplastic material coats the bundle. As the unbonded fibers are not self-sustaining without a sleeve, thermoplastic material is applied as a coating around the bundle of unbonded fibers to give the bundle a shape, resulting in a fiber rod contained within a sleeve to form a self-sustaining fluid transmissive body. The extrusion process minimizes or eliminates the void space between the sleeve and the bundled fibers.

The shape of the fiber bundle may be controlled by the use of an extruder die with a desired shape through which the bundle passes during the extrusion coating of the fiber bundle, for example to produce a circular cross-section that results in a rod for use as a cartridge in a column of a separation system.

An exemplary process for producing unbonded fiber rods using monocomponent fibers is shown in FIG. 15. The process begins at S300 and at S310 monocomponent fibers or tows are provided. At S320, the fibers are drawn using a predetermined draw ratio. The fibers are then bundled and drawn through a sizing die at S330. Upon exiting the sizing die, the bundled fibers are surrounded by an extruded thermoplastic polymer sleeve material at S340. The thermoplastic sleeve material serves to maintain the fibers in the shape established by the sizing die. The result is a self-supporting continuous sleeved fiber rod that may be cut to desired length at S350. The process ends at S360.

As in the previously described processes, the process shown in FIG. 15 may include either or both of the additional steps of applying chemical coatings to modify the fiber surface at S322 and adding non-fibrous particles to the fiber structure at S324.

It should be appreciated that because they need not be bonded to one another, the fibers of this embodiment may be bundled with any degree of entanglement ranging from highly entangled to substantially parallel along the length of the rod.

Exemplary fibers for sleeved, unbonded fiber rods include false twist yarns comprising highly entangled filaments as described in U.S. Pat. No. 4,729,808, incorporated herein by reference. Monocomponent or bicomponent fibers may be used. Fibers for use in the unbonded fiber rods may be particularly selected to have a high surface to volume ratio such as is found in 4 deep groove (4-DG) fibers or trilobal fibers, for example.

The composition of the fibers may be any thermoplastic or resin material, including by way of example only, polyamides, such as nylons, including nylon 6 and nylon 6,6; polyolefins, such as polyethylene and polypropylene; polyesters including polyethylene terephthalate and polybutylene terephthalate; polyvinyl chloride; polymers of ethylene methacrylic acid, ethylene acrylate acid, ethylene vinyl acetate, or ethylene methyl acrylate; polystyrene; polysulfones; polyphenylene sulfide; polyacetals; and polymers comprising blocks of polyethylene glycol; as well as copolymers and derivatives of all of the foregoing. Inorganic fibers such as glass or mineral fibers, including glass, treated glass, and ceramics, may also be incorporated.

The polymer for the sleeve may be any thermoplastic and may be the same or different from the polymer(s) of the fibers. Exemplary materials for use in manufacturing the sleeve may include, by way of example only, polyamides, such as nylons, including nylon 6 and nylon 6,6, polyolefins, such as polyethylene and polypropylene, polyester including polyethylene terephthalate and polybutylene terephthalate, polyvinyl chloride, polymers of ethylene methacrylic acid, ethylene acrylate acid, ethylene vinyl acetate, or ethylene methyl acrylate, polystyrene, polysulfones, polyphenylene sulfide, polyacetals, and polymers comprising blocks of polyethylene glycol, as well as copolymers and derivatives of all of the foregoing.

The foregoing embodiments have been discussed in terms of sleeved and unsleeved fiber rods that may be used as cartridges for insertion into a separate tube that provides an impermeable, pressure-resistant wall to contain the mobile phase as it passes through the fibers of the stationary phase. It should be appreciated, however, that in embodiments in which a sleeve is applied around the fibers, the fibers and sleeve may also be used as an integrated column that can be directly attached to a separation system without the need for a separate tube. In this manner, an integrated column may be manufactured or cut to any desired column length, and may include either bonded or unbonded fibers. Thus, the fibers rods of the present invention can be used with containment tubes used in current separation systems or they can be incorporated directly into a separation system, eliminating the need for a separate containment tube required in conventional separation systems.

To produce an integrated column, the thermoplastic sleeve used to surround the fibers should be specifically adapted to withstand the pressures associated with the separation process. This may affect the thermoplastic material selected for the sleeve as well as its wall thickness. The sleeve material is typically polypropylene, although LDPE, polyester, nylon, and any other material chemically inert to the components of the mobile phase and that are able to withstand the pressure gradient may be used. The sleeve may be adapted to withstand an internal pressure in the range of about 10 psi (0.7 bar) to about 5000 psi (344.7 bar), typically about 10 psi (0.7 bar) to about 2000 psi (137.0 bar), more typically about 50 psi (3.4 bar) to about 300 psi (20.6 bar). Sleeve thicknesses that achieve these results may be as thin as 0.8 μm, although typical thicknesses range from about 25 μm to about 400 μm.

In some instances, it may be desirable to introduce internal reinforcing fibers into the sleeved fiber rod during manufacture to further provide support to resist the pressure. If used, the reinforcing fibers may be introduced inside and outside of the sleeve. Any of the types of industrial filaments typically used for the reinforcement of manufactured hoses and/or tubing may be used.

Figure 4:
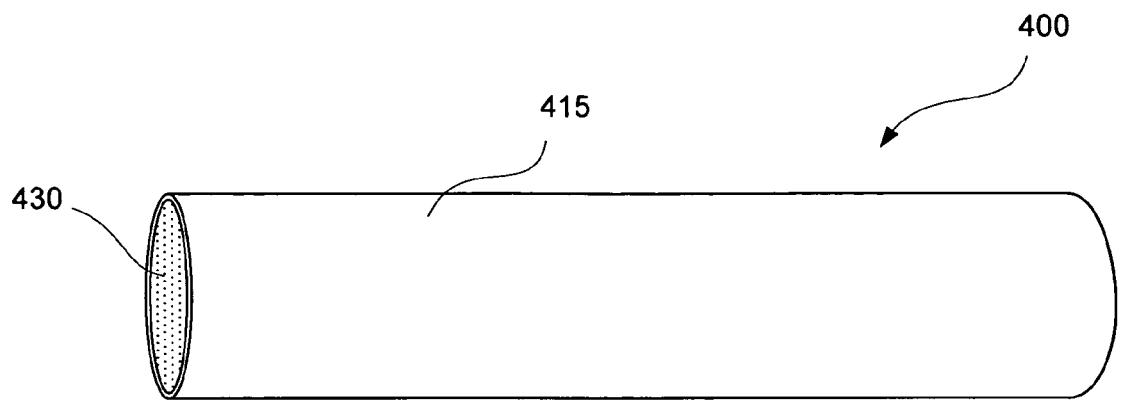
FIG. 4 illustrates an integrated separation column according to exemplary embodiments of the invention.

FIG. 4 illustrates a sleeved fiber rod 400 that may be used as an integrated separation column to replace the loaded separation tube of a conventional separation system. The sleeved fiber rod 400 comprises bundled fibers 430 that may be either bonded or unbonded. The bundled fibers 430 are surrounded by an impermeable, pressure-resistant thermoplastic polymer sleeve 415 that, as described above, serves as a containment wall for the mobile phase. The sleeved fiber rod 400 may be adapted to retrofit existing separation systems. Depending on the separation system used, it may be necessary to attach one or more porous frits and/or mechanical fittings (not shown) to connect the rod 400 to the rest of the system so that the mobile phase passes through the rod 400.

As described above, creating an integrated column in the form of a pressure-resistant sleeved fiber rod may be accomplished in a single manufacturing operation. This results in a largely automated way to inexpensively produce large numbers of integrated fiber rod columns that can easily be disposed of after use. This, in turn, results in increased productivity and value over most conventional columns that need to be manually packed, unpacked and cleaned for each use. Automated manufacturing also provides a higher level of reproducibility of the column, and thus better and more consistent separation results may be achieved.

Fiber rods for use in separation systems according to any of the foregoing embodiments may be tailored for various applications. For example, the porosity or fiber density may be modified depending on the type of separation process desired. Furthermore, mixtures of fiber types and compositions may be blended to produce custom, but reproducible columns. Various types of separation processes may be desired such as reverse phase HPLC processes, ion-exchange processes, size-exclusion processes, as well as those that take advantage of affinity and hydrophobic interactions. These processes may be particularly advantageous for biomolecule separations. Biomolecules may include, for example, proteins, polypeptides, polynucleotides, and polysaccharides.

Additional modification of the fiber rods may be made depending on the desired end use.

During manufacture of fiber rods for use in separation columns according to any of the foregoing embodiments, small particles such as highly microporous beads, powders and nanoparticles may be incorporated with the fibers to further aid in separation of analytes. Up to about 80% by weight of the column may comprise particles. The particles may be selected for incorporation into a fiber rod based on particular stationary phase properties that are desired for an intended separation process. For example, acrylamide, polystyrene or styrene/divinylbenzene beads may be added to aid in affinity separations. In other cases, beads having ion exchange properties may be desired, such as derivatized styrene/divinylbenzene. Beads incorporated into the fiber rod may typically range from less than about 1 µm to about 100 µm in diameter. Other porous particles such as silicas, coated silicas, polymethylmethacrylate (PMMA), styrene/divinylbenzene (DVB) and zeolytes, etc. may also be used.

Figure 5:
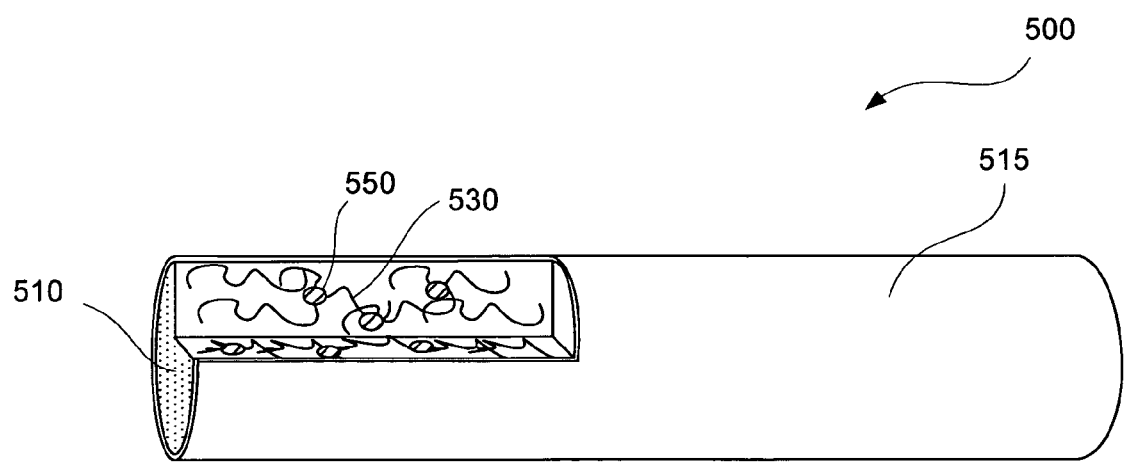
FIG. 5 is a cut away view of an integrated separation column, illustrating the inclusion of particulate materials within a fiber rod.

An exemplary embodiment of a sleeved fiber rod 500 incorporating particulate materials is shown in FIG. 5. The sleeved fiber rod 500 comprises a sleeve 515 and a fiber rod 510 comprising fibers 530 which may be bonded or unbonded. Beads 550 are randomly dispersed throughout the rod. These beads may simply be embedded within the interstices of the fiber structure or may be bonded to the fibers. Depending on the fiber and particle materials, this may be accomplished by injecting or blowing the particles into the fiber structure and applying heat.

In still other embodiments of the invention, the fibers may comprise coatings adhered or bonded to the surface of the fibers, which are typically applied following drawing of the fibers during the fiber production process. These coatings may be added to further enhance separation as the mobile phase passes through the column and the stationary phase. For example, fibers may be treated with fluorocarbon to increase the hydrophobicity of the stationary phase. The increase in hydrophobicity may increase certain proteins' interaction with the fiber surface, increasing the residence time of that protein in the column and providing better separation from hydrophilic components. Exemplary coatings include C-4, C-8, and C-18, as well as hydrophilic coatings. Other coatings that may be employed include ionic, non-ionic, polar, and non-polar as are known to those of ordinary skill in the art.

In yet additional embodiments of the invention, the fibers may be selected to have intrinsic surface functionality for particular chromatographic separations. For example, in certain embodiments separation of chiral components may be desired. Fibers possessing chirality, such as D- or L-polylactic acid, may be incorporated in an effective amount to separate the chiral components. In other embodiments, ionomer fibers such as ethylene/acrylic acid copolymers, ethylene/methacrylic acid copolymers (NUCREL-type polymers) and salts of same may be incorporated with the other fibers of the rod. Alternatively, the surface of the fibers of the rods may be modified to impart a particular functionality that is not otherwise intrinsic to the fibers. Exemplary treatments to modify the fiber surface may include corona, ozone, ultraviolet radiation, heat and/or oxidative reduction treatments.

Embodiments of the present invention may be used in combination with a variety of mobile phases when used together in a separation process. The mobile phase may be any fluid, although liquids are typically used over gases. Conventional packing materials often have a limited range of compatible solvents that can be used. Conversely, columns using fiber rods can be used with a wider range of compatible solvents and demonstrate resistance that may cause chemical degradation when the same solvents are used with conventional packing materials. Unlike most conventional packing materials, the polymers used in fiber rods of the present invention are more compatible with mobile phase components over a greater pH range. While conventional packing materials are typically compatible with a mobile phase having a narrow pH range, fiber rods of the present invention (e.g., fiber rods having polyolefin or ethylene acid copolymer fibers) have been demonstrated in a pH range from 1 to 14. The fibers' resistance to solvents provides an extended usable life over prior materials, particularly where the fiber rods are used in continuous separations, such as preparatory separations.

Exemplary solvents include water, acetonitrile (ACN), and combinations of the two, although any solvent that dissolves the analytes under consideration may be used. Mobile phase flow rates may be up to about 10 mL/min or higher depending on column diameter, while still retaining low back pressures in the column, although rates are typically about 1 to about 4 mL/min for smaller diameter columns. The components in the mobile phase to be dissolved in the solvent may comprise any mixture of components. The components may be known components that are desired to be separated for individual collection or the components may be unknown. For example, a mixture may be known to contain certain organic compounds, but their identities may be unknown. The components are separated and as each component elutes from the column, it is analyzed to determine its identity.

It should be appreciated that fiber rods according to embodiments of the invention may be used for both analytical and preparatory separations. In preparatory separations, higher concentrations of analytes are separated and collected, which may then be subsequently prepared for later use. Preparatory separations are typically performed in HPLC or gravity-fed columns for example, using columns of low pressure and large cross-sectional area. Preparatory separations typically employ a column having a cross-sectional area greater than 4.6 mm.

When the separations are used as preparatory processes, eluent may be collected until all of a particular analyte has eluted. The eluent may then be collected again in a separate container until all of a next analyte has eluted and so on until all of the analytes of interest have been collected. Following collection, the eluent containing solvent and a particular analyte may be separated and/or refined for later use in another application.

The invention is now further described with respect to the following non-limiting examples.

EXAMPLES

Separations of mixtures of different proteins injected into solvent were conducted using an HPLC system including a Waters 1525 Binary HPLC Pump, Waters 2487 Dual Wavelength Absorbance Detector, and a Waters In-Line Degasser AF. Various protein mixtures were analyzed including some or all of the following: Ribonuclease A, Cytochrome C, Lysozyme, and Myoglobin. The proteins tested were present at a concentration of 300 ppm each. All of the proteins were commercially obtained from Sigma (St. Louis, Mo.). The eluents used were acetonitrile (ACN), ACN with 0.06% trifluoroacetic acid (TFA) and water with 0.1% TFA, wherein the percentages of TFA in solvent are on a volume/volume basis. The ACN and TFA were each commercially obtained from Sigma-Aldrich (St. Louis, Mo.). Separation columns with various fiber rods were then incorporated into the HPLC system and separation experiments were conducted.

Example 1

Figure 6:
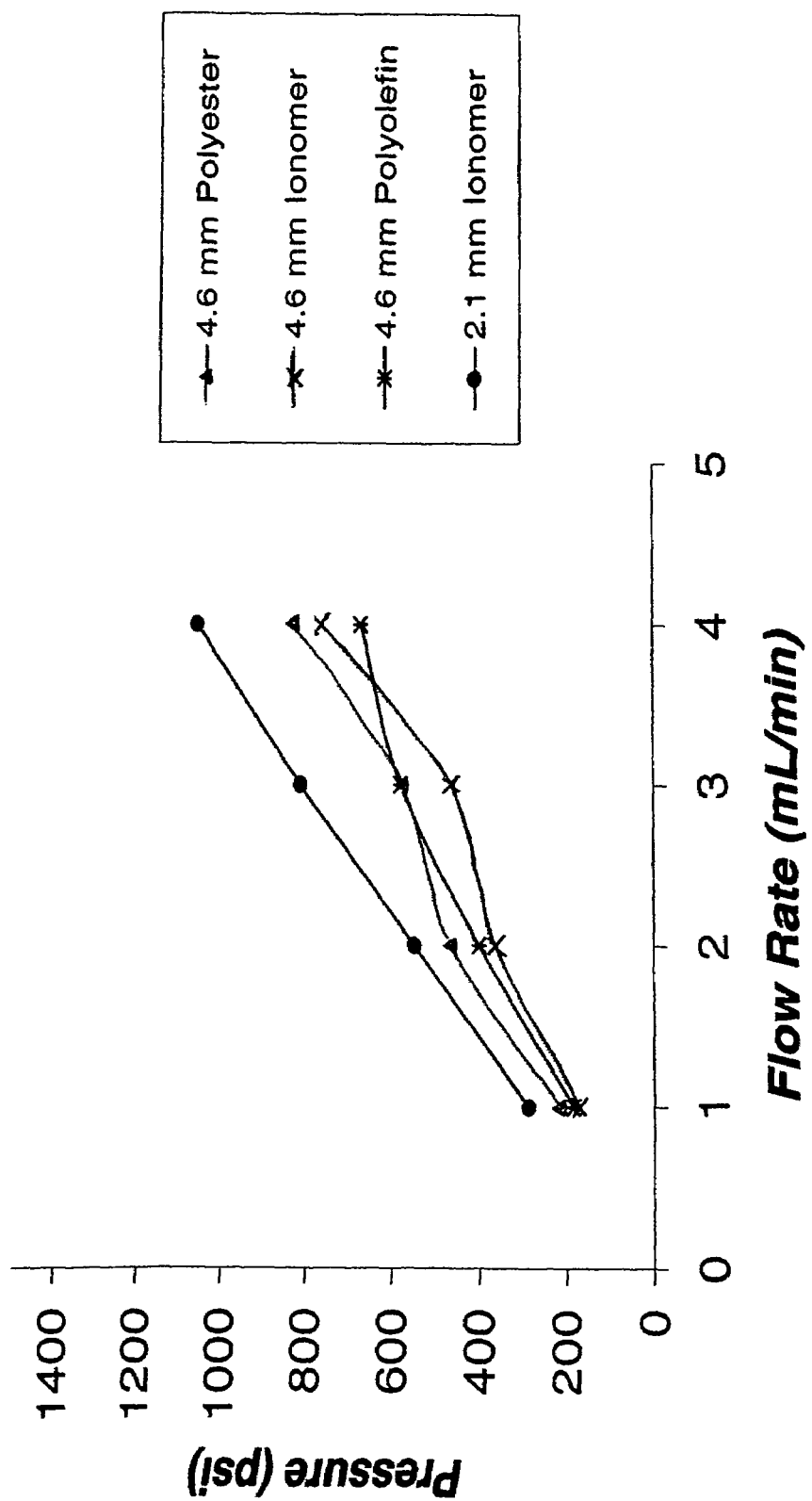
FIG. 6 is a graphical representation of back pressure versus flow rate for various fiber rod compositions.

Separations were conducted using various fiber rods to measure pressure as a function of flow rate. Polyester, ionomer, and polyolefin bonded fiber rods 4.6 mm in diameter were used. Additionally, an ionomer bonded fiber rod with a diameter of 2.1 mm was also used. The fiber rods were then inserted into a steel tube for use with a separation system as described, the steel tube obtained from Alltech Associates, Inc. of Deerfield, Ill. Flow rate was varied from one to four mL/min. The results are shown in FIG. 6. In all cases, low back pressures were produced and even at flow rates of 4 mL/min, pressure was well under about 1500 psi (about 103.4 bar).

Example 2

Bonded bicomponent, sleeve-wrapped fiber rods were tested to determine average maximum back pressures and average maximum flow rates. The fiber rods were 100 mm in length and had a porosity ranging from 40% to 50%. The compositions of the fibers in this example were polyethylene terephthalate (PET)/co-polymers of polyethylene terephthalate (COPET) wrapped in polypropylene (PP), nylon/PET wrapped in PP, and nylon/PET wrapped in nylon. Results for these examples are shown in Table 1.

TABLE 1

| Core/Sheath Fiber Materials (Sleeve Material) | Avg. Max Flow Rate (mL/min) | Avg. Max Back Pressure (psi) | Avg. Max Back Pressure (bar) |
|---|---|---|---|
| PET/CoPET (PP) | 4 | 553 | 38.1 |
| PET/Nylon (PP) | 7.7 | 1224 | 84.4 |
| PET/Nylon (Nylon) | 7.7 | 1224 | 84.4 |

Example 3

A 250 mm bonded fiber rod having a diameter of 4.6 mm and porosity of 45% was used as a stationary phase. The fibers of the fiber rod were co-extruded ethylene acid copolymer resin (available as NUCREL from E.I. DuPont de Nemours of Wilmington, Del.)/PP sheath/core bicomponent fibers using NUCREL 2940. The PP was Pinnacle PP 1630 available from Pinnacle Polymers of Garyville, La. The fiber rod was then inserted into a PEEK-lined steel tube. The column was created to separate a protein mixture of Ribonuclease A, Cytochrome C, Lysozyme and Myoglobin. The separation was conducted with a mobile phase that had a solvent that started at 85% water with 0.1% TFA and 15% ACN with 0.06% on a volume/volume basis. The separation was run under gradient conditions over 60 minutes such that the end composition of the solvent of the mobile phase was 70% water with 0.1% TFA and 30% ACN with 0.06% TFA. The flow rate of the mobile phase was 1.75 mL/min.

Figure 7:
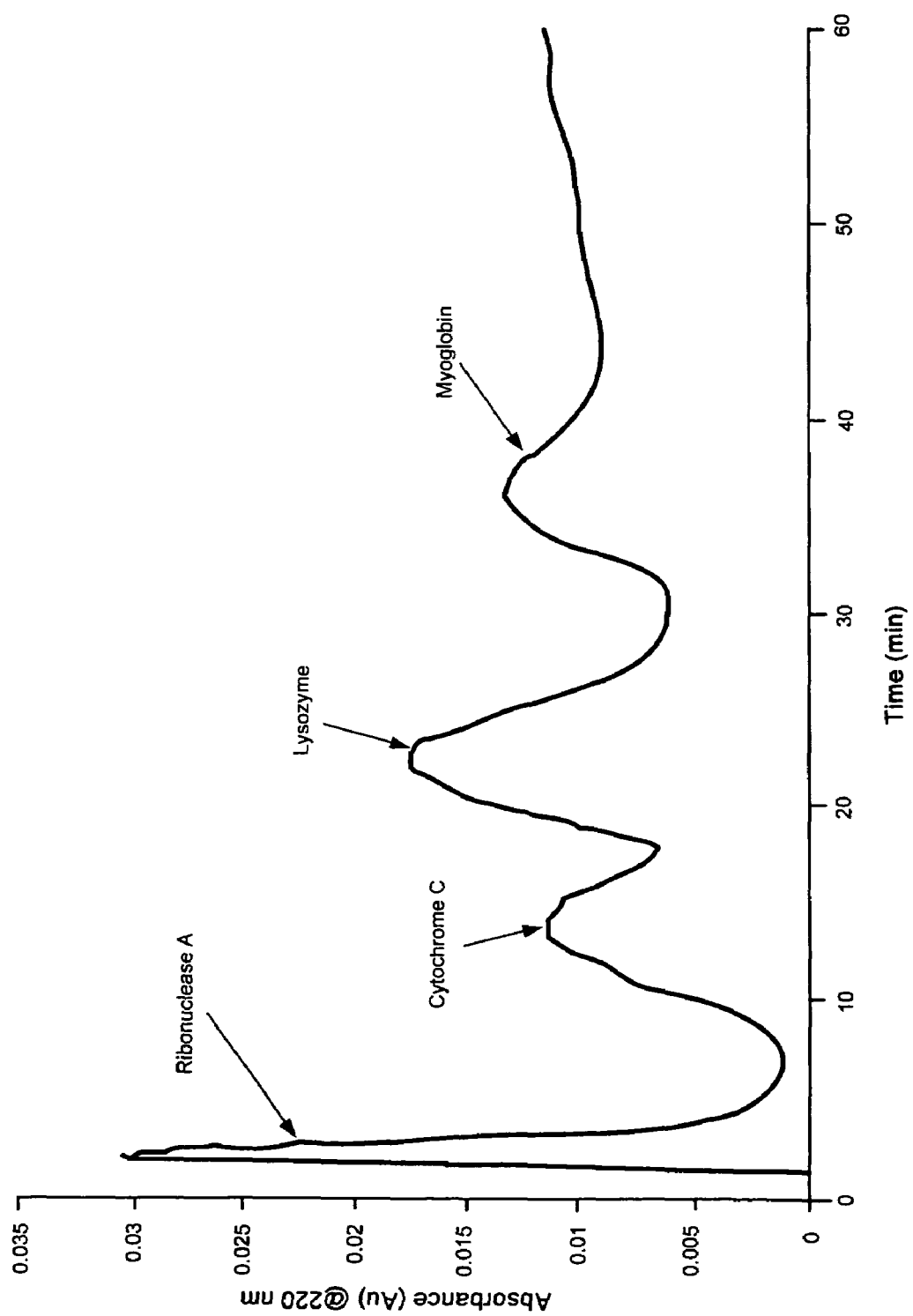
FIGS. 7-11 are graphical representations of the results separation processes using fiber rods according to exemplary embodiments of the invention.

Table 2 shows results of this example, which are also shown graphically in FIG. 7 as a function of absorbance versus elution time.

TABLE 2

| Fiber Material | Protein | Retention Time (min) | Selectivity ($\alpha$) | Resolution (R) |
|---|---|---|---|---|
| Nucrel/PP | Ribonuclease A | 1.8 | n/a | n/a |
|  | Cytochrome C | 13.1 | 11.6 | 2 |
|  | Lysozyme | 22.2 | 1.7 | 0.9 |
|  | Myoglobin | 37.1 | 1.7 | 1.34 |

Example 4

A 250 mm fiber rod having a diameter of 4.6 mm and a porosity of 46% was prepared using unbonded 4-DG PP fibers obtained from Fiber Innovative Technology (FIT) of Johnson City, Tenn. The 4-DG fibers were wrapped with a PP sleeve using PP available as P4G4Z-011 from Huntsman of Salt Lake City, Utah. The fiber rod of Example 4 was then used as an integrated column, the 4-DG fibers acting as the stationary phase. This column was created to separate a three protein mixture of Ribonuclease A, Cytochrome C and Myoglobin. The separation was conducted with a mobile phase that had a solvent that started at 80% water with 0.1% TFA and 20% ACN with 0.06% TFA.

The separation was run under gradient conditions over 10 minutes such that the end composition of the solvent of the mobile phase was 60% water with 0.1% TFA and 40% ACN with 0.06% TFA. The flow rate of the mobile phase during separation was maintained at 1.75 mL/min.

Figure 8:
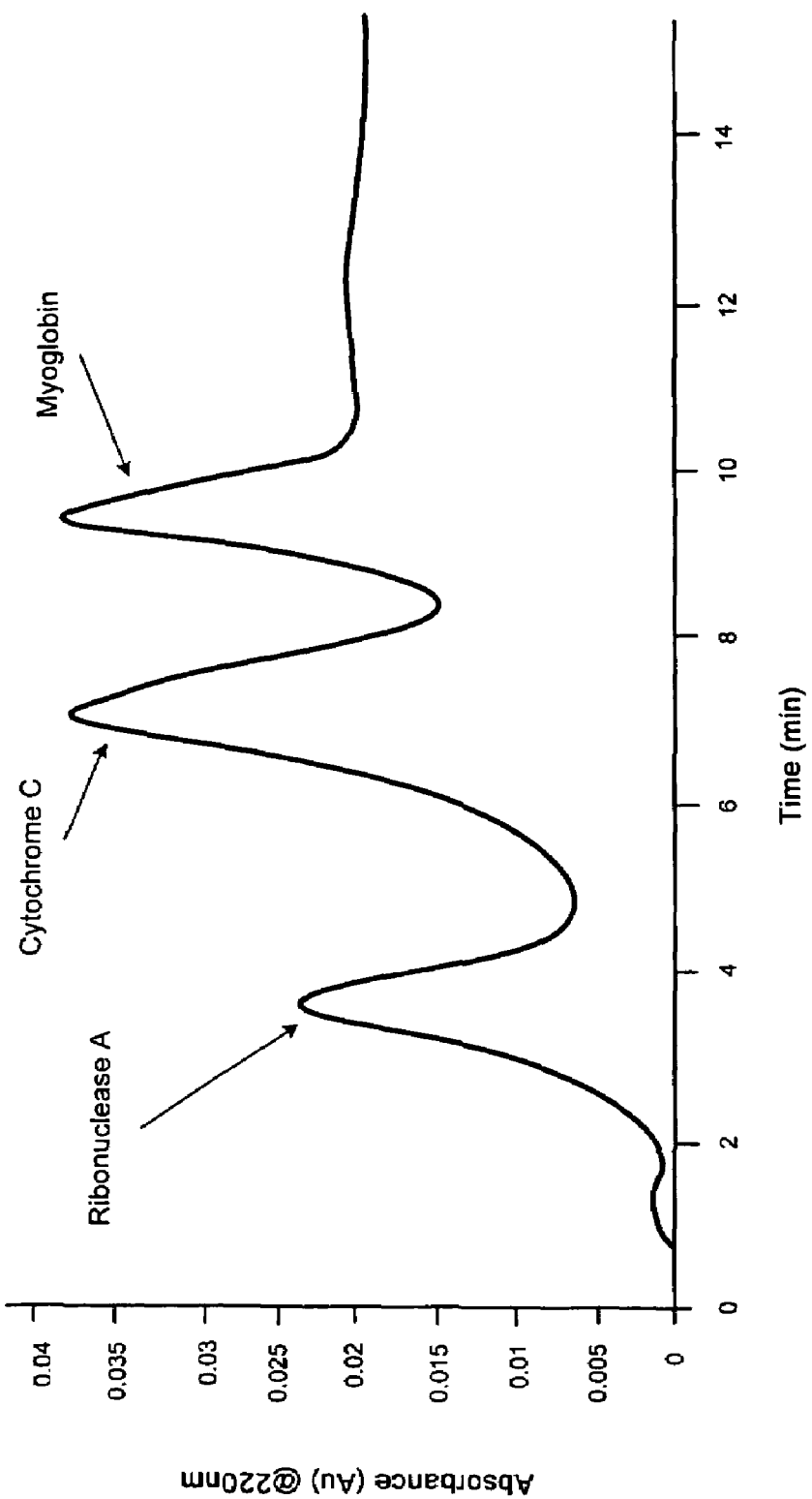

Table 3 shows results of this example in which RSD stands for Relative Standard Deviation. The results are also shown graphically in FIG. 8 as a function of absorbance versus elution time.

TABLE 3

| Fiber Material | Protein | Retention Time (min) | Selectivity (α) | Resolution (R) | RSD (%) |
|---|---|---|---|---|---|
| PP | Ribonuclease A | 3.6 | n/a | n/a | 1.2 |
| | Cytochrome C | 13.1 | 11.6 | 2 | 0.4 |
| | Myoglobin | 37.1 | 1.7 | 1.34 | 0.5 |

Example 5

A bonded PP/LDPE trilobal fiber rod was used in Example 5. The fibers of the fiber rod were produced using Dow (Midland, Mich.) NRD1234 PP and Equistar (Houston, Tex.) NA270 LDPE resulting in a sheath/core bicomponent fiber. The bonded fiber rod was 250 mm in length and had a diameter of 4.6 mm. Porosity was 42%.

This column was constructed to separate a three protein mixture of Ribonuclease A, Cytochrome C and Myoglobin. Separation was conducted with a mobile phase that had a solvent that started at 85% water with 0.1% TFA and 15% ACN with 0.06% TFA. The separation was run under gradient conditions over 10 minutes such that the end composition of the solvent of the mobile phase was 70% water with 0.1% TFA and 30% ACN with 0.06% TFA. The flow rate of the mobile phase was 4.0 mL/min.

Figure 9:
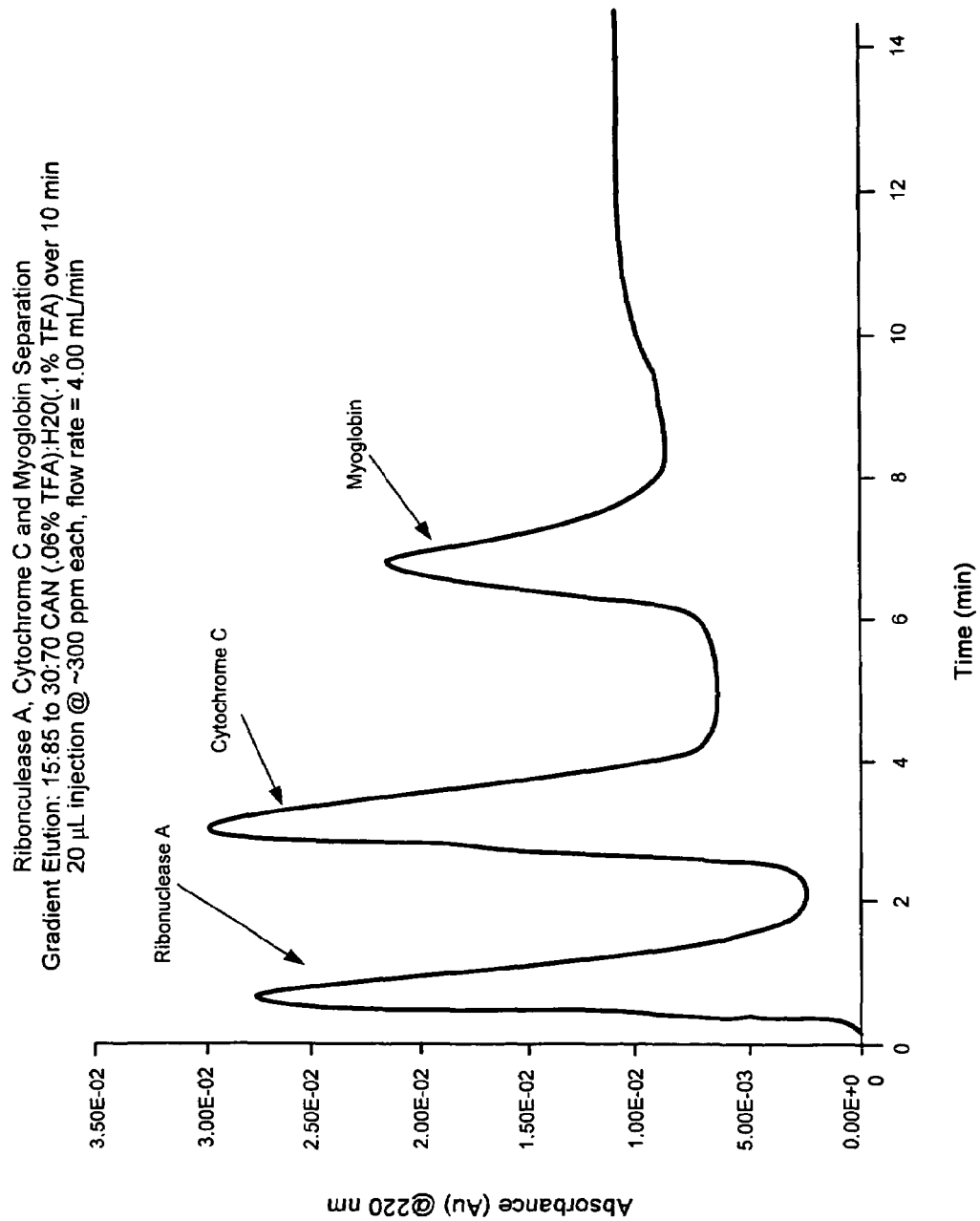

Table 4 shows results of this example, which are also shown graphically in FIG. 9 as a function of absorbance versus elution time.

TABLE 4

| Fiber Material | Protein | Retention Time (min) | Selectivity (α) | Resolution (R) |
|---|---|---|---|---|
| PP/LDPE | Ribonuclease A | 0.7 | n/a | n/a |
| | Cytochrome C | 3.3 | 19.7 | 1.6 |
| | Myoglobin | 7.0 | 2.4 | 2.2 |

Example 6

A bonded PET/CoPET fiber rod having a length of 250 mm, a diameter of 4.6 mm and a porosity of 41% was produced using PET/CoPET sheath/core bicomponent fibers. The fibers were coextruded using Crystar 4446 PET and Crystar 4441 CoPET, both available from E.I. DuPont de Nemours of Wilmington, Del. The column of Example 6 was constructed to separate a protein mixture of Ribonuclease A and Cytochrome C.

Separation was conducted with a mobile phase that had a solvent that started at 80% water with 0.1% TFA and 20% ACN with 0.06% TFA. The separation was run under gradient conditions over 10 minutes such that the end composition of the solvent of the mobile phase was 70% water with 0.1% TFA and 30% ACN with 0.06% TFA. The flow rate of the mobile phase was 1.75 mL/min.

Figure 10:
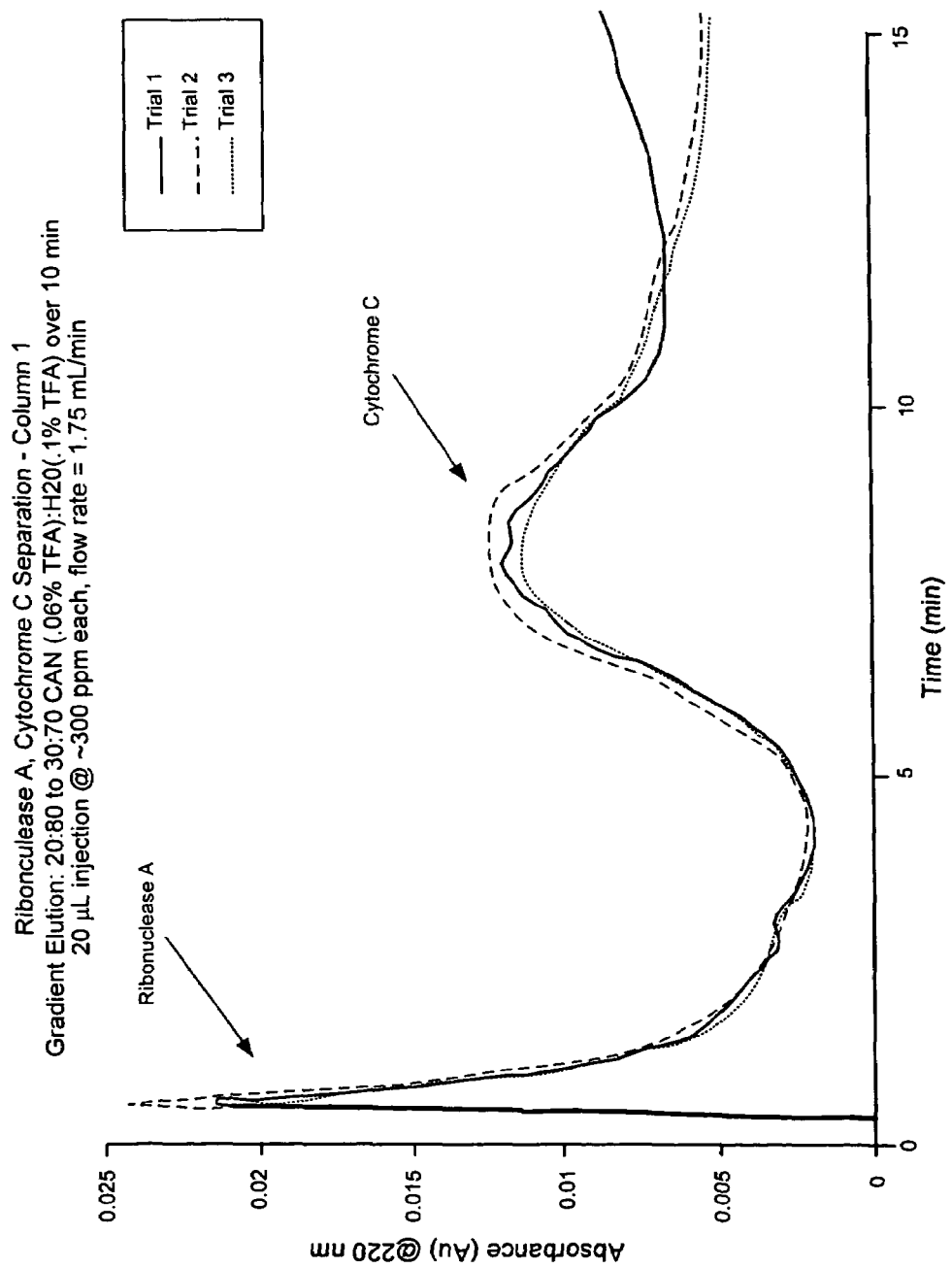

Table 5 shows results of this example. Results for three different trials are also shown graphically in FIG. 10 as a function of absorbance versus elution time, which illustrates the reproducibility of the fiber rods and separation results when the rods are used as a stationary phase.

TABLE 5

| Fiber Material | Protein | Retention Time (min) | Selectivity (α) | Resolution (R) | RSD (%) |
|---|---|---|---|---|---|
| PET/ CoPET | Ribonuclease A | 0.9 | n/a | n/a | 1.0 |
| | Cytochrome C | 7.4 | 78 | 3.11 | 2.5 |

Example 7

An extrusion wrapped polyester fiber rod was used in Example 7. This column was constructed to separate a three-protein mixture of Ribonuclease A, Cytochrome C Myoglobin. As in other examples, the rod was 250 mm in length and 4.6 mm in diameter. Porosity was 74%. Unifi 2/150/100 polyester fibers available from Unifi of Greensboro, N.C. were used, the rod produced by wrapping the unbonded PET fibers in a PP sleeve, again using Huntsman P4G4Z011. Separation was conducted in a mobile phase that had a solvent that started at 80% water with 0.1% TFA and 20% ACN with 0.06% TFA. The separation was run under gradient conditions over 20 minutes such that the end composition of the solvent of the mobile phase was 60% water with 0.1% TFA and 40% ACN with 0.06% TFA. The flow rate of the mobile phase was 1.75 mL/min.

Figure 11:
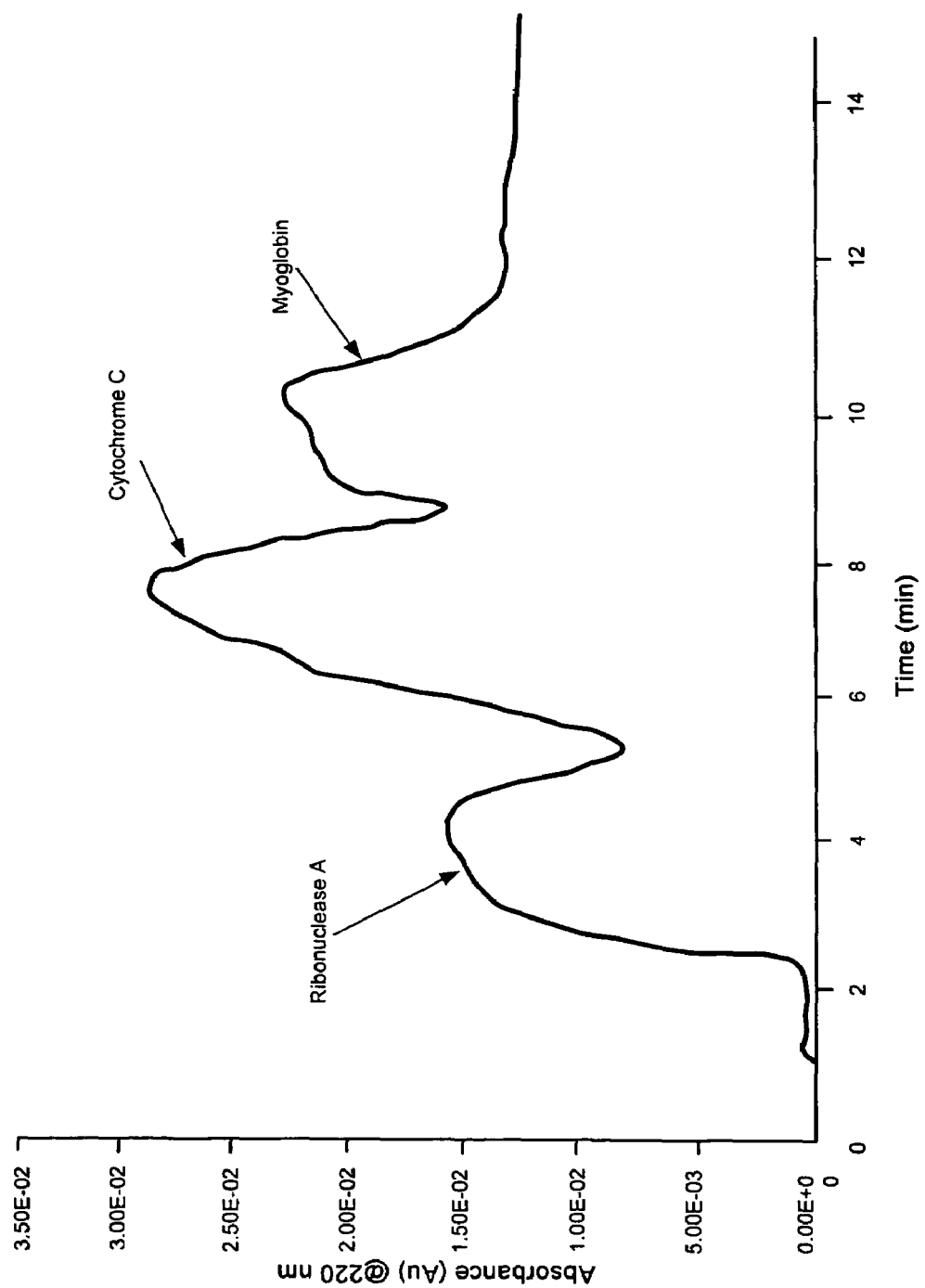

Table 6 shows results of this example, which are also shown graphically in FIG. 11 as function of absorbance versus elution time.

TABLE 6

| Fiber Material | Protein | Retention Time (min) | Selectivity (α) | Resolution (R) |
|---|---|---|---|---|
| PET | Ribonuclease A | 3.4 | n/a | n/a |
| | Cytochrome C | 7.2 | 2.5 | 1.3 |
| | Myoglobin | 10.0 | 1.4 | 0.9 |

The foregoing non-limiting examples demonstrate the ability of chromatography columns comprising various fiber rods is effective as a stationary phase to separate compounds, such as proteins, from a mobile phase.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed is:

1. A separation element for use in a chromatographic analysis system for the separation of a mixture using a stationary phase and a mobile phase, the separation element comprising:

a fluid transmissive fiber rod comprising
    a plurality of bundled entangled fibers configured to
        provide a tortuous path that promotes uniform flow through which a mobile phase may flow as part of a separation process, the plurality of fibers providing a stationary phase for the separation process and an impermeable thermoplastic sleeve surrounding, confining and being adhered to the plurality of bundled entangled fibers, wherein the plurality of bundled fibers and impermeable thermoplastic sleeve are integrally manufactured.

2. The separation element of claim 1 wherein the bundled fibers are entangled and bonded to each other at spaced apart contact points to form a self-sustaining fiber structure.

3. The separation element of claim 1 wherein the fibers are unbonded and wherein the sleeve supports and contains the bundled fibers to form a self-supporting rod structure.

4. The separation element of claim 1 wherein the impermeable thermoplastic sleeve comprises at least one of the group consisting of polypropylene, polyethylene, polyester and nylon.

5. The separation element of claim 1 wherein the impermeable thermoplastic sleeve is adapted to withstand an internal pressure in a range of about 10 psi to about 5000 psi.

6. The separation element of claim 1 wherein the impermeable thermoplastic sleeve is adapted to withstand an internal pressure in a range of about 50 psi to about 300 psi.

7. The separation element of claim 1 wherein the fiber rod has a length dimension that is at least about 5 cm.

8. The separation element of claim 1 wherein the fiber rod has a maximum cross-section dimension in a range of about 1 μm to about 1000 mm.

9. The separation element of claim 1 wherein the fiber rod has has a maximum cross-section dimension in a range of about 1 mm to about 300 mm.

10. The separation element of claim 1 wherein the fiber rod has a porosity of about 10% to about 90%.

11. The separation element of claim 1 wherein the fiber rod has a porosity of about 30% to about 50%.

12. The separation element of claim 1 wherein the plurality of fibers includes individual fibers having a diameter in a range of about 1 μm to about 150 μm.

13. The separation element of claim 1 wherein the fibers comprise bicomponent fibers.

14. The separation element of claim 1 wherein the fibers comprise at least one polymer selected from the group consisting of polyamides, polyolefins, polyesters, polyvinyl chloride, ethylene/acrylic acid copolymers and salts of same, ethylene/methacrylic acid copolymers and salts of same, ethylene vinyl acetate, polystyrene, polysulfones, polyphenylene sulfide, polyacetals, and polymers comprising blocks of polyethylene glycol, copolymers thereof and derivatives thereof.

15. The separation element of claim 1 wherein the fibers comprise at least one polymer selected from the group consisting of nylons, nylon 6, nylon 6,6 polyethylene, polypropylene, polyethylene terephthalate, polybutylene terephthalate, copolymers thereof and derivatives thereof.

16. The separation element of claim 1 wherein the fiber rod further comprises non-fibrous particles.

17. The separation element of claim 16 wherein the non-fibrous particles are selected from the group consisting of beads, powders, and nanoparticles.

18. The separation element of claim 16 wherein the non-fibrous particles comprise at least one of the set consisting of silicas, coated silicas, PMMA styrene/DVB and zeolytes.

19. The separation element of claim 1 further comprising a coating on the surface of the fibers.

20. The separation element of claim 19 wherein the coating comprises a compound selected from the group consisting of fluorocarbon, C-4, C-8, C-18, and hydrophilic coatings.

21. The separation element of claim 1 wherein the fluid transmissive fiber rod is adapted for use with a mobile phase comprising at least one of water or TFA.

22. The separation element of claim 1 wherein the fluid transmissive fiber rod is adapted for use with a mobile phase comprising a solvent and at least two components to be separated.

23. The separation element of claim 1 wherein the fluid transmissive fiber rod is adapted for use with a mobile phase comprising a solvent at least two components to be separated.

24. The separation element of claim 23 wherein at least one of the at least two components to be separated comprises a biomolecule.

25. The separation element of claim 24 wherein the biomolecule is selected from the group consisting of a protein, a polypeptide a polysaccharide, and a polynucleotide.

26. The separation element of claim 1 wherein the chromatographic analysis system includes a separation column tube having an impermeable, pressure-resistant wall and wherein the fiber rod is adapted for insertion into the separation column tube.

* * * * *